United States Patent
Yu et al.

(10) Patent No.: US 11,405,972 B2
(45) Date of Patent: Aug. 2, 2022

(54) RADIO LINK FAILURE (RFL) PROCEDURE WITH GENERIC CELL GROUP MANAGEMENT

(71) Applicant: QUALCOMM Incorporated, San Diego, CA (US)

(72) Inventors: Yu-Ting Yu, San Francisco, CA (US); Keiichi Kubota, Tokyo (JP); Gavin Bernard Horn, La Jolla, CA (US); Karthika Paladugu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 30 days.

(21) Appl. No.: 16/425,146

(22) Filed: May 29, 2019

(65) Prior Publication Data

US 2019/0373663 A1 Dec. 5, 2019

Related U.S. Application Data

(60) Provisional application No. 62/679,438, filed on Jun. 1, 2018.

(51) Int. Cl.
*H04W 76/18* (2018.01)
*H04W 92/10* (2009.01)
(Continued)

(52) U.S. Cl.
CPC ....... *H04W 76/18* (2018.02); *H04W 72/0493* (2013.01); *H04W 76/30* (2018.02); *H04W 80/02* (2013.01); *H04W 92/10* (2013.01)

(58) Field of Classification Search
CPC . H04W 36/0069; H04W 92/10; H04W 92/12; H04B 7/06
See application file for complete search history.

(56) References Cited

U.S. PATENT DOCUMENTS

2016/0095004 A1* 3/2016 Tseng .................... H04W 48/00
370/329
2016/0338136 A1 11/2016 Zhang et al.
(Continued)

FOREIGN PATENT DOCUMENTS

EP          2811801 A1     12/2014

OTHER PUBLICATIONS

ETRI: "Discussion on S-RLF in Dual Connectivity", 3GPP Draft; R2-143409, 3rd Generation Partnership Project (3GPP), Mobile Competence Centre; 650, Route Des Lucioles ; F-06921 Sophia-Antipolis Cedex France, vol. RAN WG2, No. Dresden, Germany; Aug. 18, 2014-Aug. 22, 2014, Aug. 8, 2014 (Aug. 8, 2014), pp. 1-4, XP050819639, Retrieved from the Internet: URL: http://www.3gpp.org/ftp/tsg_ran/WG2_RL2/TSGR2_87/Docs/ [retrieved on Aug. 8, 2014].

(Continued)

*Primary Examiner* — Ayaz R Sheikh
*Assistant Examiner* — Debebe A Asefa
(74) *Attorney, Agent, or Firm* — Holland & Hart LLP

(57) ABSTRACT

Methods, systems, and devices for wireless communications are described. One example method for wireless communications at a user equipment (UE) includes detecting a radio link failure (RLF) condition for a connection between the UE and a network over a first cell group and determining, in response to detecting the RLF condition, whether an air interface resource allocation is available for a signaling radio bearer (SRB) between the UE and the network over another cell group. The method also includes selecting, based at least in part on the determination, one of a plurality of RLF procedures. In some examples, the UE may select a first RLF procedure that fully releases radio resources when no SRB is available and a different, second RLF procedure (Continued)

that partially when an SRB is available between the UE and the network over a second cell group.

44 Claims, 12 Drawing Sheets

(51) Int. Cl.
    *H04W 76/30* (2018.01)
    *H04W 72/04* (2009.01)
    *H04W 80/02* (2009.01)

(56) References Cited

U.S. PATENT DOCUMENTS

| | | |
|---|---|---|
| 2017/0331577 A1 | 11/2017 | Parkvall et al. |
| 2018/0054834 A1 | 2/2018 | Lee et al. |
| 2018/0124612 A1 | 5/2018 | Babaei et al. |
| 2018/0124831 A1 | 5/2018 | Dinan |
| 2019/0059031 A1* | 2/2019 | Hahn ............... H04W 36/08 |
| 2020/0015142 A1* | 1/2020 | Jia ................. H04W 36/305 |
| 2020/0022215 A1* | 1/2020 | Takahashi ......... H04W 76/19 |
| 2020/0245392 A1 | 7/2020 | Yu |
| 2020/0260347 A1 | 8/2020 | Xu et al. |

OTHER PUBLICATIONS

International Search Report and Written Opinion—PCT/US2019/034535—ISA/EPO—dated Sep. 23, 2019.

Ericsson: "SCell RLF Discussion (TP to 38.331)", R2-1802650 (Revision of R2-1801014), 3GPP TSG-RAN WG2 #101, Athens, Greece, Feb. 26-Mar. 2, 2018, pp. 1-6.

Ericsson: "MCG RLF Handling in Case of NR-NR DC", Tdoc R2-1802682 (Resubmission of R2-1801075), 3GPP TSG-RAN WG2 #101, Athens, Greece, Feb. 26-Mar. 2, 2018, pp. 1-2.

\* cited by examiner

RADIO LINK FAILURE (RFL) PROCEDURE WITH GENERIC CELL GROUP MANAGEMENT

CROSS REFERENCES

The present Application for Patent claims the benefit of U.S. Provisional Patent Application No. 62/679,438 by Yu et al., entitled "Radio Link Failure (RLF) Procedure With Generic Cell Group Management," filed Jun. 1, 2018, assigned to the assignee hereof, and expressly incorporated herein.

BACKGROUND

The following relates generally to wireless communications, and more specifically to procedures for radio link failure (RLF) with generic cell group management.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communications systems, a UE may be configured for multi-connectivity (e.g., dual connectivity), where the UE can communicate with multiple cell groups simultaneously. Additionally, the UE may be further configured with one or more split bearers in order to communicate with the cell groups. For example, a transmission may be sent over the split radio bearers from multiple cell groups, where the transmission and split radio bearers may be associated with signaling or data. In some cases, the transmission may be duplicated for each of the split radio bearers to enhance reliability. Alternatively, the transmission may be sent over whichever split radio bearer is determined to have a better radio path for the UE. However, in some cases, a radio link failure (RLF) may occur with one of the cell groups. The UE may have to perform a radio link failure procedure that resets all the radio resources, despite having an additional cell group that could support communications. The UE may have to wait for the network to reconfigure the one or more split radio bearers, which may increase latency for transmissions and increase inefficiency. Improved techniques are desired for handling a cell group radio link failure.

SUMMARY

The described techniques relate to improved methods, systems, devices, and apparatuses that support RLF procedures with generic cell group management. Generally, the described techniques provide for selecting different radio link failure procedures in response to a radio link failure condition for multi-connectivity UEs. A multi-connectivity UE can be connected to two or more cell groups at the same time. Some of these cell groups may split signal radio bearers (SRBs) for the UE between them. When a UE is connected to such a cell group and the cell group has an RLF condition, the UE may perform one of a plurality of RLF procedures in response to the RLF condition.

A method of wireless communications at a UE is described. The method may include detecting a radio link failure condition for a connection between the UE and a network over a first cell group, determining, in response to detecting the radio link failure condition, whether an air interface resource allocation is available for a signaling radio bearer (SRB) between the UE and the network over another cell group, and selecting, based on the determination, one of a set of radio link failure procedures.

An apparatus for wireless communications at a UE is described. The apparatus may include a processor, memory coupled with the processor, and instructions stored in the memory. The instructions may be executable by the processor to cause the apparatus to detect a radio link failure condition for a connection between the UE and a network over a first cell group. The instructions may also be executable by the processor to determine, in response to detecting the radio link failure condition, whether an air interface resource allocation is available for a signaling radio bearer (SRB) between the UE and the network over another cell group, and select, based on the determination, one of a set of radio link failure procedures.

Another apparatus for wireless communications at a UE is described. The apparatus may include means for detecting a radio link failure condition for a connection between the UE and a network over a first cell group. The apparatus may also include means for determining, in response to detecting the radio link failure condition, whether an air interface resource allocation is available for a signaling radio bearer (SRB) between the UE and the network over another cell group. The apparatus may also include means for selecting, based on the determination, one of a set of radio link failure procedures.

A non-transitory computer-readable medium storing code for wireless communications at a UE is described. The code may include instructions executable by a processor to detect a radio link failure condition for a connection between the UE and a network over a first cell group. The code may also include instructions executable by a processor to determine, in response to detecting the radio link failure condition, whether an air interface resource allocation is available for a signaling radio bearer (SRB) between the UE and the network over another cell group, and select, based on the determination, one of a set of radio link failure procedures.

Some examples of the method, apparatuses, and non-transitory computer-readable medium described herein may further include operations, features, means, or instructions for identifying a type of the cell group as one of: a controlling cell group (CCG) or a non-controlling cell group (NCCG). In some example, selecting one of the set of radio link failure procedures may be further based on the type of the first cell group.

In some examples of the method, apparatuses, and non-transitory computer-readable medium described herein, selecting one of the set of radio link failure procedures may further include operations, features, means, or instructions for selecting a first radio link failure procedure in response to determining that no SRB may be available between the UE and the network over another cell group. The examples may also include performing the first radio link failure procedure, where the first radio link failure procedure includes a full release of radio resources between the UE and the network.

In some examples of the method, apparatuses, and non-transitory computer-readable medium described herein, performing the first radio link failure procedure may further include operations, features, means, or instructions for suspending all radio bearers of the UE and resetting MAC settings of the UE.

In some examples of the method, apparatuses, and non-transitory computer-readable medium described herein, performing the first radio link failure procedure may further include operations, features, means, or instructions for releasing all secondary cells (SCells) associated with the first cell group; or and releasing all other cell groups associated with the connection.

In some examples of the method, apparatuses, and non-transitory computer-readable medium described herein, selecting one of the set of radio link failure procedures may include operations, features, means, or instructions for selecting a second radio link failure procedure in response to determining that an SRB may be available between the UE and the network over a second cell group and performing the second radio link failure procedure, where the second radio link failure procedure includes a partial release of radio resources between the UE and the network.

In some examples of the method, apparatuses, and non-transitory computer-readable medium described herein, performing the second radio link failure procedure may further include operations, features, means, or instructions for transmitting an indication of the radio link failure condition to the another cell group using the SRB.

In some examples of the method, apparatuses, and non-transitory computer-readable medium described herein, performing the second radio link failure procedure may further include operations, features, means, or instructions for suspending all data radio bearers (DRBs) associated with the first cell group, suspending transmissions on resources of the first cell group, and resetting a MAC entity corresponding to the first cell group.

In some examples of the method, apparatuses, and non-transitory computer-readable medium described herein, determining whether the air interface resource allocation may be available may further include operations, features, means, or instructions for determining that the air interface resource allocation may not be available when an SRB may not be configured for a RLC or a MAC on the another cell group or determining that the air interface resource allocation may not be available when a resource allocation for the SRB may not be activated on the another cell group.

DETAILED DESCRIPTION

Figure 1:
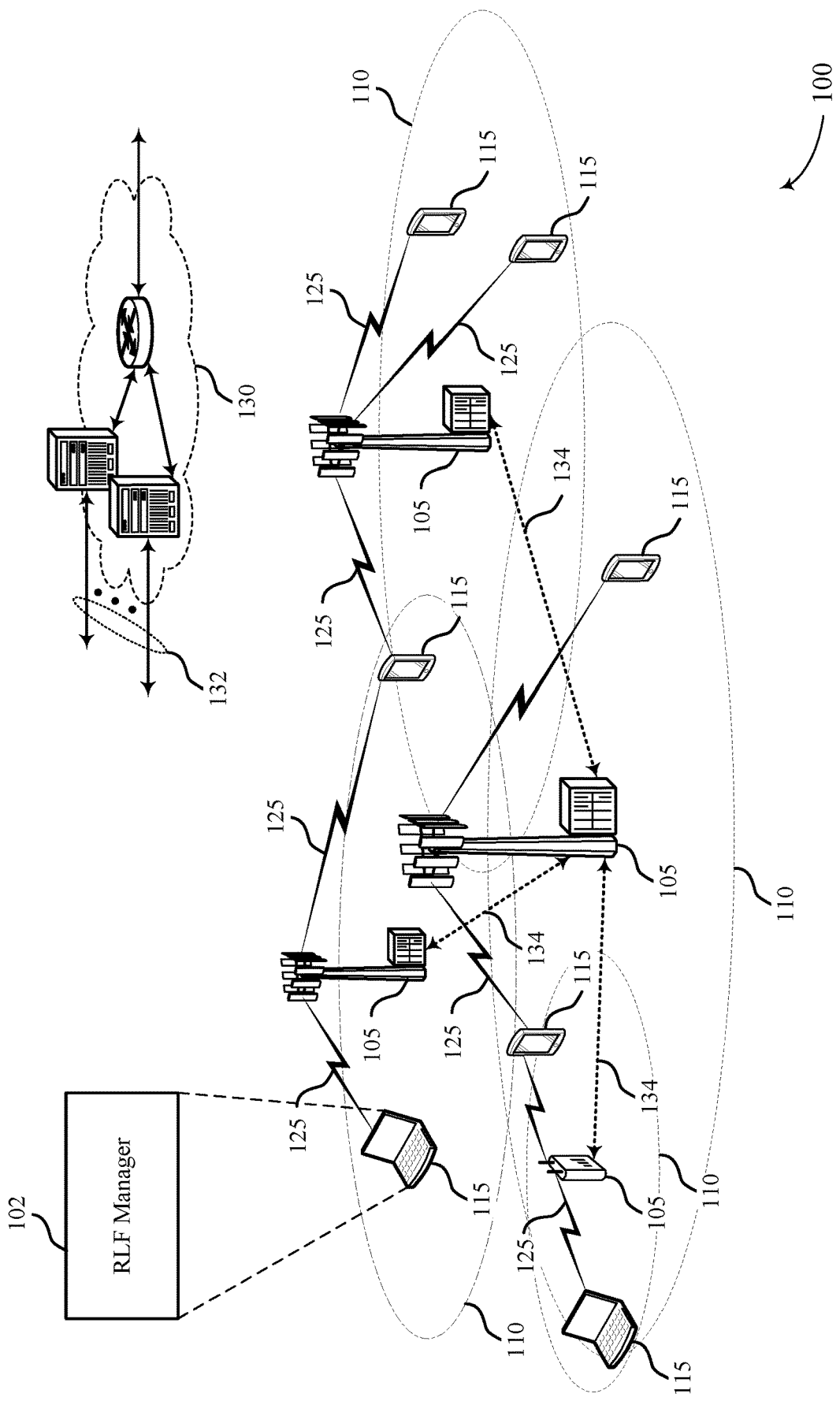
FIG. 1 illustrates an example of a system for wireless communications that supports RLF with generic cell group management in accordance with aspects of the present disclosure.

In some examples of a wireless communications systems, a user equipment (UE) may communicate with one or more cell groups of one or more base stations (e.g., through multi-connectivity communications). Additionally, different base stations may operate on the same or different radio access technologies (RATs) (e.g., long term evolution (LTE) or new radio (NR)). After being configured with the multi-connectivity operations, the UE may further be configured with one or more split radio bearers. In such examples, the radio resource control (RRC) configuration for the network may inform the UE of the cell groups and that the SRB is split. The split radio bearers may enable the UE to transmit or receive a message through one or more of the cell groups. For example, the message may be duplicated for each of the split radio bearers to enhance reliability (e.g., packet data convergence protocol (PDCP) duplication). Alternatively, the message may be transmitted or received over whichever split radio bearer is determined to have a better radio path for the UE.

In some cases, a radio link failure (RLF) may occur for communications between one of the cell groups and the UE. In systems that do not support multi-connectivity, in response to an RLF condition, the UE performs an RLF procedure based on whether the cell group is a master cell group (MCG) or a secondary cell group (SCG). If the failing cell group is an MCG, the RLF procedure includes suspending all radio blocks, resetting a Medium Access Control (MAC) setting, releasing any MCG secondary cells (Scells), releasing any SCGs, and performing a radio resource control (RRC) connection reestablishment. If the failing cell group is a SCG, the RLF procedure is a secondary RLF (S-RLF) procedure, which includes suspending all SCG data radio bearers (DRBs), resetting the SCG MAC, and providing an indication of the S-RLF to the network.

When the RLF procedure includes suspending all radio bearers, the UE continues to retain the configuration for the cell groups. For example, whenever a radio bearer is suspended for a cell group in the NCCG category (or an inactive cell group category), the UE or the network could promote that NCCG to a CCG and resume communications with the configurations that the UE already has in its memory. In contrast, when a release is performed, the UE forgets all the configurations and the network will have to send the configuration information anew when communications are reestablished.

However, for a multi-connectivity device, there are more choices for an RLF procedure, according to techniques described herein. After being configured with the multi-connectivity operations, the UE may further be configured with one or more split radio bearers (SRBs). The split radio bearers may enable the UE to transmit or receive a message through multiple distributed units (DUs) which may be associated with one or more cell groups. For example, the message may be duplicated for each of the split radio bearers to enhance reliability (e.g., packet data convergence protocol (PDCP) duplication). Alternatively, the message may be transmitted or received over whichever split radio bearer is determined to have a better radio path for the UE.

Cell groups may be controlling cell groups (CCGs) or non-controlling cell groups (NCCGs). In some examples, a CCG can also be referred to as a master cell group and a NCCG may be referred to as a secondary cell group. For example, the terms MCG and SCG may be used in a dual connectivity example. From the point of view of a UE, a CCG is a cell group that hosts a radio link control (RLC) entity of SRB. In contrast, an NCCG is a cell group that does not host an RLC entity of SRB. A single UE may be configured with multiple CCGs, multiple NCCGs, or a combination of CCGs and NCCGs.

In some cases, a radio link failure (RLF) may occur for communications between the cell groups and the UE. Instead of performing an RLF procedure based on whether the cell group is an MCG or a SCG, the UE may perform different RLF procedures based on whether there are additional air interface resource allocation is available for an SRB between the UE and the network over another cell group. For example, when a UE is connected to at least two cell groups, and one cell group fails while another cell group has not, it would be inefficient to perform a full radio resource release for all the radio resources allocated to the UE. Instead, if there is not another cell group available when the cell group the UE has the radio connection with has the RLF condition, the UE may perform a first RLF procedure. Alternatively, if there is another cell group available that is a CCG when the cell group that the UE previously had a radio connection with has failed, the UE may perform a second RLF procedure. The second RLF procedure may enable the UE to make use of the split SRB, which may improve the efficiency of the network. For example, instead of waiting for the network to reconfigure the one or more split radio bearers, the UE may utilize the one or more SRBs that are still available.

Aspects of the disclosure are initially described in the context of a wireless communications system. A block diagram provides an example structure for a network device that supports the RLF procedures described herein. Example process flows illustrate different implementations of the RLF procedures. Aspects of the disclosure are further illustrated by and described with reference to apparatus diagrams, system diagrams, and flowcharts that relate to RLF condition handling with cell group management.

FIG. 1 illustrates an example of a wireless communications system 100 that supports RLF with generic cell group management in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE- Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A MAC layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RB s) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

One or more of the UEs 115 may include an RLF manager 102, which may perform radio link failure procedures according to techniques described herein. The RLF manager 102 may detect a radio link failure condition for a connection between the UE and a network over a first cell group. The RLF manager 102 may also determine, in response to detecting the radio link failure condition, whether an air interface resource allocation is available for a signaling radio bearer (SRB) between the UE and the network over another cell group. The RLF manager 102 may also select, based at least in part on the determination, one of a plurality of radio link failure procedures.

Figure 2:
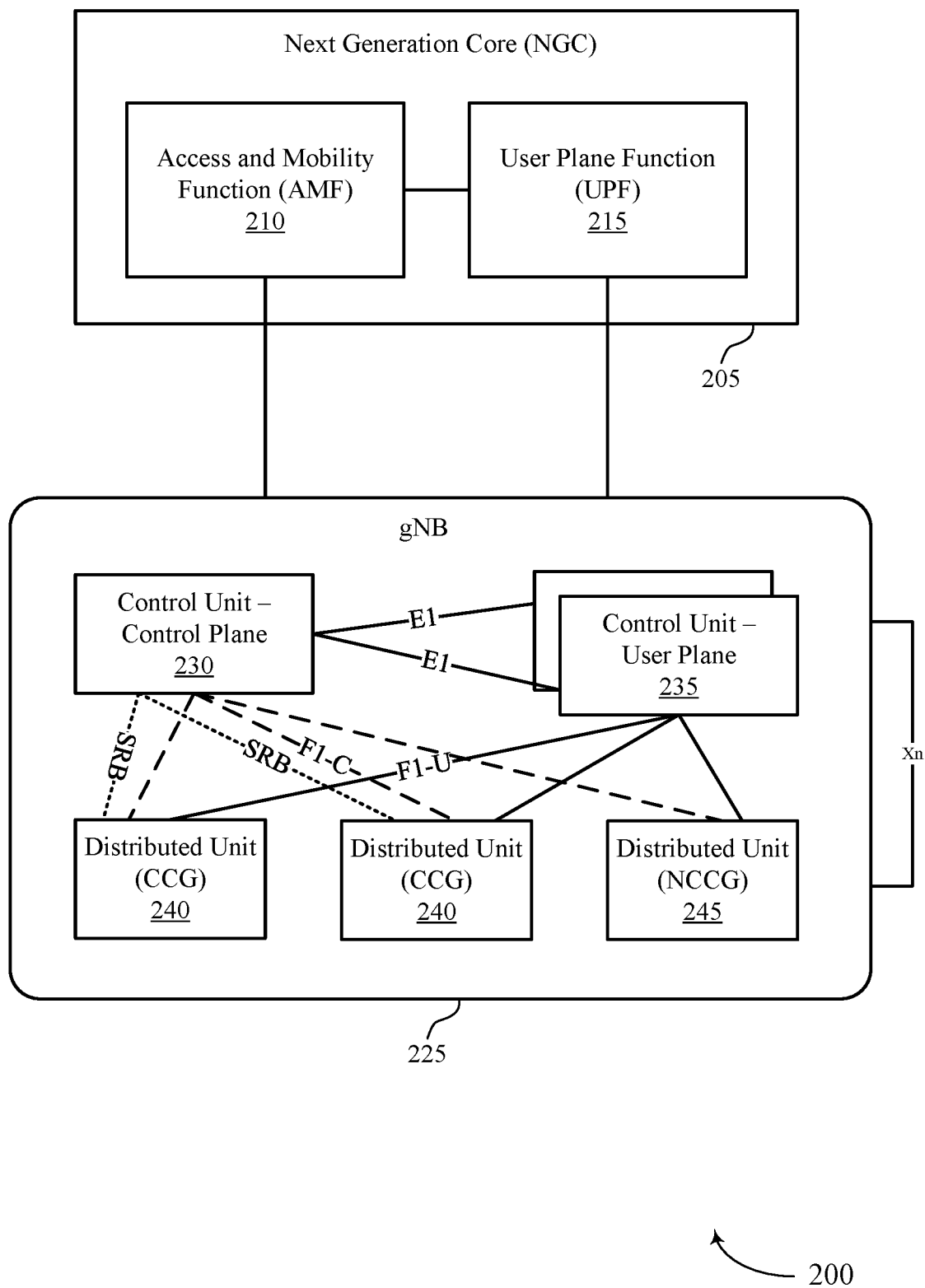
FIG. 2 illustrates an example of a network configuration that supports RLF with generic cell group management in accordance with aspects of the present disclosure.

FIG. 2 illustrates an example of a network configuration 200 that supports multiple RLF procedures with generic cell group management in accordance with aspects of the present disclosure. In some examples, the network configuration 200 may implement aspects of wireless communications system 100.

The network configuration 200 includes a gNB 225 and a next generation core (NGC) 205. In some examples, the network configuration 200 may be considered a distributed implementation of a gNB 225. The NGC 205 may be implemented at least partially in a network cloud. The NGC 205 may include an access and mobility function (AMF) 210 and a user plane function (UPF) 215.

The gNB 225 may include one or more control units (CUs). A CU is a component of a gNB, such as the gNB 225, that controls different cell groups that are part of the gNB. For example, the gNB 225 of FIG. 2 includes a control plane control unit (CU-CP) 230 and two user plane control units (CU-UPs) 235. In other examples, the gNB 225 can include different numbers of CU-CPs 230 and CU-UPs 235. In some examples, the CU-CP 230 and a CU-UP 235 can be one instance of running and controlling control plane functions for the gNB in the cloud.

The gNB 225 may also include one or more distributed units (DUs) 240 and 245. A DU 240 is a functional node of the gNB 225 that performs a subset of the gNB functions based on functional split options. The operation of the DU 240 is controlled by the CU-CP 230 and the CU-UP 235. In some examples, each DU 240, 245 may be a radio proximate to a UE. The DUs 240, 245 may be controlled by a control unit, such as the CU-CP 230 and the CU-UP 235. The CU-CP 230 controls the control plane for the DUs 240, 245 and the CU-UP 235 controls the user plane for the DUs 240, 245.

In this example, a cell group is mapped to a single DU 240, 245. Each DU 240, 245 may support carrier aggregation, so each DU 240, 245 may have multiple carriers. In this example, the DUs 240 are CCGs and the DU 245 is a NCCG. The SRB is split between the two DUs 240 here, since these are the DUs that host the RLC entity of the SRB. As can be seen from this example, the SRB is not necessarily split on every DU 240, 245. The CU-CP 230 and the CU-UP 235 may be managing a broad area of DUs 240, 245, but the SRB may be configured to be only split for the DUs with which the UE is most likely to communicate. For example, the SRB may be split among the DUs 240, while the DU 245 may be used as a backup in case the DUs 240 fail.

In other examples, the SRB can be split between a single DU 240, 245 or between three or more DUs 240, 245. In some examples, an SRB may be split on a single DU 240, 245 using carrier aggregation duplication. In such a situation, the single DU 240, 245 may host two RLC entities. Each RLC entity may be associated with different cells on the DU 240, 245. Each of the RLC entities may be associated with different cells on the DU 240, 245.

Returning to the example of FIG. 2, a UE connected to the gNB 225 is configured for dual- or multi-connectivity duplication. This may mean that there are multiple RLC entities that run on the DUs 240, 245. The UE learns of the configuration from the gNB 225, which informs the UE of which DUs 240, 245 are associated with the SRB. For example, the gNB 225 provides configuration information to the UE, which indicates that the SRB is split between the DUs 240. From this, the UE knows which cell groups are the CCGs. By default, in some cases, any cell groups that are associated with the DU 245 and do not host an RLC entity of the SRB, are NCCGs. Such NCCGs may have a DRB associated with them, but not an SRB.

When an RLF condition occurs on one of the cell groups, the UE may select the RLF procedure to follow based on what type of cell group failed, and whether there is an air interface resource allocation available for an SRB between the UE and the gNB 225 over another cell group. If the failing cell group is an NCCG, the UE may perform an RLF procedure that is similar to that of LTE, or of single connectivity devices. In the case that the cell group is an NCCG, there is no air interface resource allocation available for an SRB, because the SRB is not split. The RLF procedure may be a full release of radio resources.

On the other hand, if the failing cell group is a CCG, the UE may perform a different RLF procedure. If there is an additional air interface resource allocation available for the SRB between the UE and the gNB 225, the UE may only release part of the radio resources. Additional air interface resource allocations may be available when there is another, functioning CCG to which the UE is connected. The radio resources not released may be used with that CCG. The UE may continue transmissions using the available CCG. If that CCG were to also fail, the UE could perform the analysis again. If there is a third CCG available, the UE could perform another partial release of radio resources. This may continue as long as there is an available and working CCG. However, in some cases, if the failing CCG is the last working CCG, then the UE performs the full release of radio resources, since there is no additional CCG to share the SRB.

Figure 3:
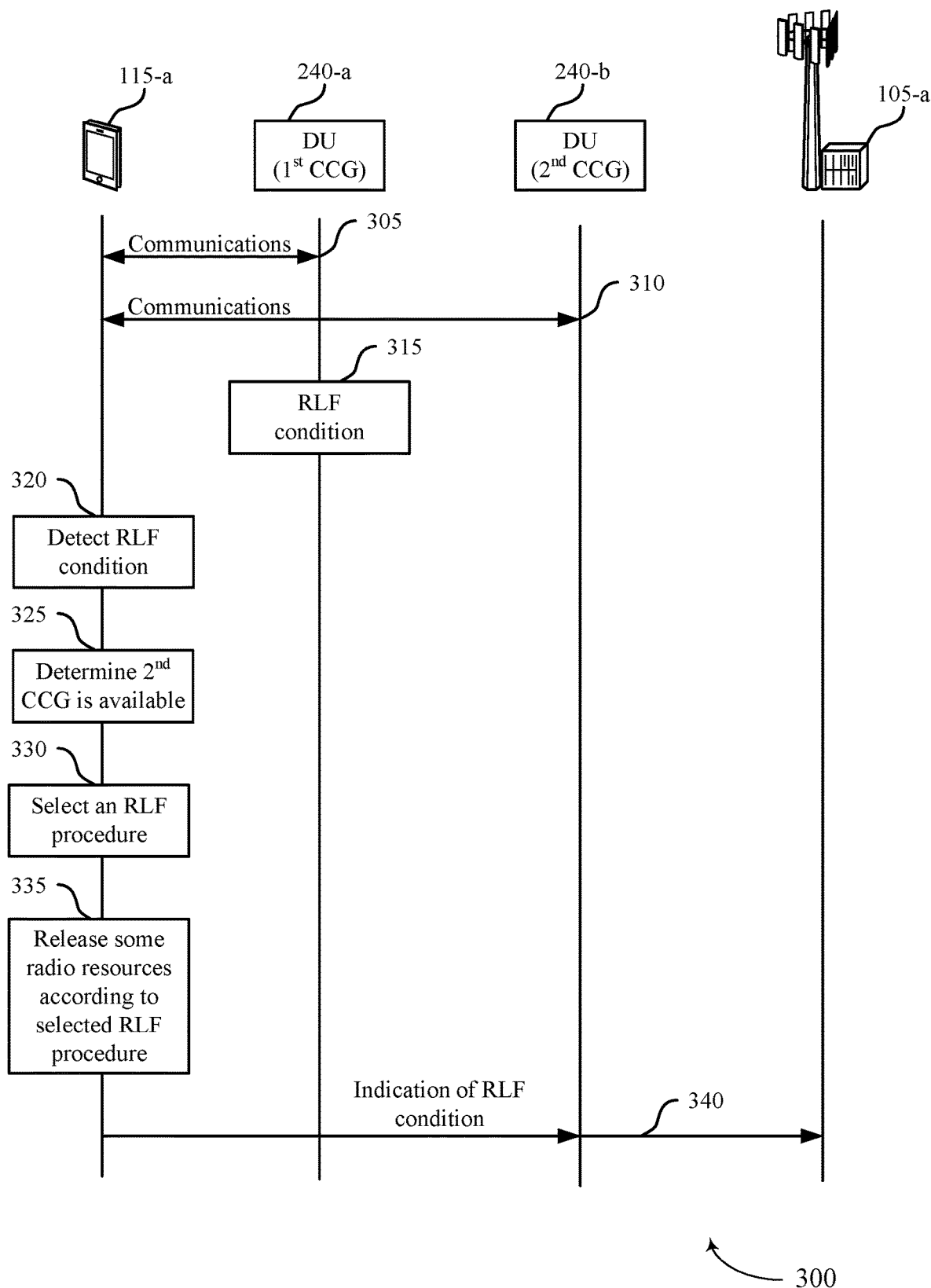
FIGS. 3 and 4 illustrate examples of process flows that support RLF with generic cell group management in accordance with aspects of the present disclosure.

FIG. 3 illustrates an example of a process flow 300 that supports RLF with generic cell group management in accordance with aspects of the present disclosure. In some examples, process flow 300 may implement aspects of wireless communications system 100. In process flow 300, a UE 115-a may be in communication with a network, represented by gNB 105-a, using multiple DUs 240-a and 240-b. The UE 115-a may be an example of aspects of a UE 115 as described herein. The gNB 105-a may be an example of aspects of a gNB 105 as described herein. The DUs 240-a, 240-b may be an example of aspects of a DU 240 as described herein.

In process flow 300, the UE 115-a and the DU 240-a exchange communications 305. That is, the UE 115-a may be in radio connection with a cell group associated with the DU 240-a. In this example, the UE 115-a may support dual connectivity or multi-connectivity. The DU 240-a may be associated with a CCG and therefore hosts at least one RLC entity of an SRB. Furthermore, in this example, the DU 240-b may be associated with a CCG and therefore hosts an RLC entity of the SRB. The UE 115-b may be in radio connection with a cell group associated with the DU 240-b and exchange communications 310. Therefore, the UE 115-a is in radio connection with one or more direct or split DRB and SRB, and at least one leg of a split SRB of the associated radio bearers is configured on the associated cell group.

At block 315, and RLF condition is present for the DU 240-a. The UE 115-a detects the RLF condition for the DU 240-a at block 320. An RLF condition may be determined by a number of different means. One way to detect an RLF condition is to receive or detect a T310 expiry, which indicates a physical layer problem with the DU 240-a. Another indication is if an RLC RETX_COUNT exceeds a transmission limit. An additional method for determining that an RLF condition has occurred is to detect random access problems. In other examples, other indications of an RLF condition may be used.

At block 325, the UE 115-a determines whether there is another CCG available. In some examples, determining whether a second CCG is available includes determining whether there are additional air interface resource allocations available. In this example, the DU 240-b is a second CCG for the UE 115-a. The DU 240-b provides an additional air interface resource allocation because it hosts an RLC entity of SRB. The DU 240-b may be available because it has not met any RLF conditions.

Based on determining that there is another CCG available, the UE 115-a selects an RLF procedure at block 330. In this case, the UE 115-a selects the secondary RLF procedure, which only partially releases radio resources. The UE 115-a selects the secondary RLF procedure when a cell group has met an RLF condition and at least one CCG is still available. The secondary RLF procedure may include one or more of suspending the failing cell group's RLC transmissions and resetting the MAC of the failing cell group. The UE 115-a performs the selected RLF procedure at block 335. The UE 115-a may also indicate, via another path that is available, the performance of the secondary RLF procedure to the gNB 105-a. For example, the UE 115-a provides an indication of the RLF condition 335 to the gNB 105-a. In some examples, the UE 115-a may provide the indication of the RLF condition 335 to the DU 240-b. The UE 115-a may continue communications using its radio connection with the DU 240-b.

Figure 4:
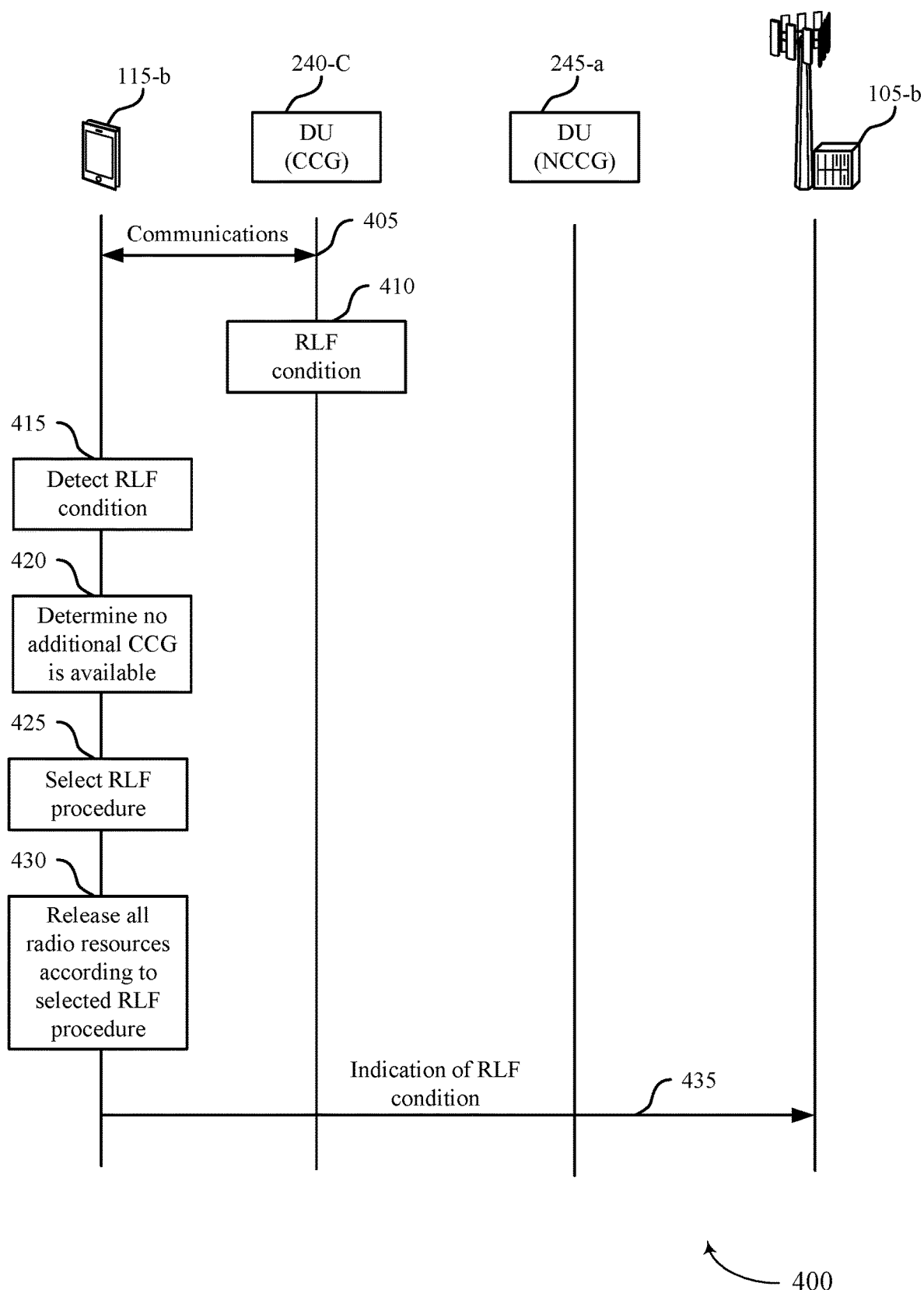

FIG. 4 illustrates an example of a process flow 400 that supports RLF with generic cell group management in accordance with aspects of the present disclosure. In some examples, process flow 400 may implement aspects of wireless communications system 100.

In process flow 400, a UE 115-b may be in communication with a network, represented by gNB 105-b, using multiple DUs 240-c and 245-a. The UE 115-b may be an example of aspects of a UE 115 as described herein. The gNB 105-b may be an example of aspects of a gNB 105 as described herein.

In process flow 400, the UE 115-b and the DU 240-c exchange communications 405. The UE 115-b may be in radio connection with a cell group associated with the DU 240-b. In this example, the UE 115-b may support dual connectivity or multi-connectivity. The DU 240-c may be associated with a CCG and therefore hosts an RLC entity of an SRB. Therefore, the UE 115-b is in radio connection with one or more direct or split DRB and SRB, and at least one leg of a split SRB of the associated radio bearers is configured on the associated cell group. Furthermore, in this example, the DU 245-a may not be associated with a CCG and therefore does not host an RLC entity of the SRB. That is, the DU 245-a is associated with a NCCG.

At block 410, and RLF condition is present for the DU 240-c. The UE 115-b detects the RLF condition for the DU 240-c at block 415. An RLF condition may be determined by a number of different means. One way to detect an RLF condition is to receive or detect a T310 expiry, an RLC RETX_COUNT exceeding a transmission limit, or detection of random access problems. In other examples, other indications of an RLF condition may be used.

At block 420, the UE 115-b determines whether there is another CCG available. In some examples, determining whether a second CCG is available includes determining whether there are any additional air interface resource allocations available. In this example, the DU 245-a is an NCCG for the UE 115-a. The DU 245-a does not provide an additional air interface resource allocation because it does not host an RLC entity of SRB.

The UE 115-b selects an RLF procedure at block 425 based on determining that there is not another CCG available. In this case, the UE 115-b selects the RLF procedure that fully releases radio resources. The UE 115-b selects this RLF procedure when a cell group to which it is connected has met an RLF condition and it is the last CCG available. The RLF procedure may include one or more of suspending all radio bearers (e.g., SRBs and DRBs), resetting the MAC of the failing cell group, releasing failing cell group secondary cells (Scells), releasing all remaining cell groups, and performing an RRC connection reestablishment if security is already activated. The UE 115-b performs the selected RLF procedure at block 430. The UE 115-b may also indicate, via another path that is available, the performance of the RLF procedure to the gNB 105-b. For example, the UE 115-b provides an indication of the RLF condition 435 to the gNB 105-b.

Figure 5:
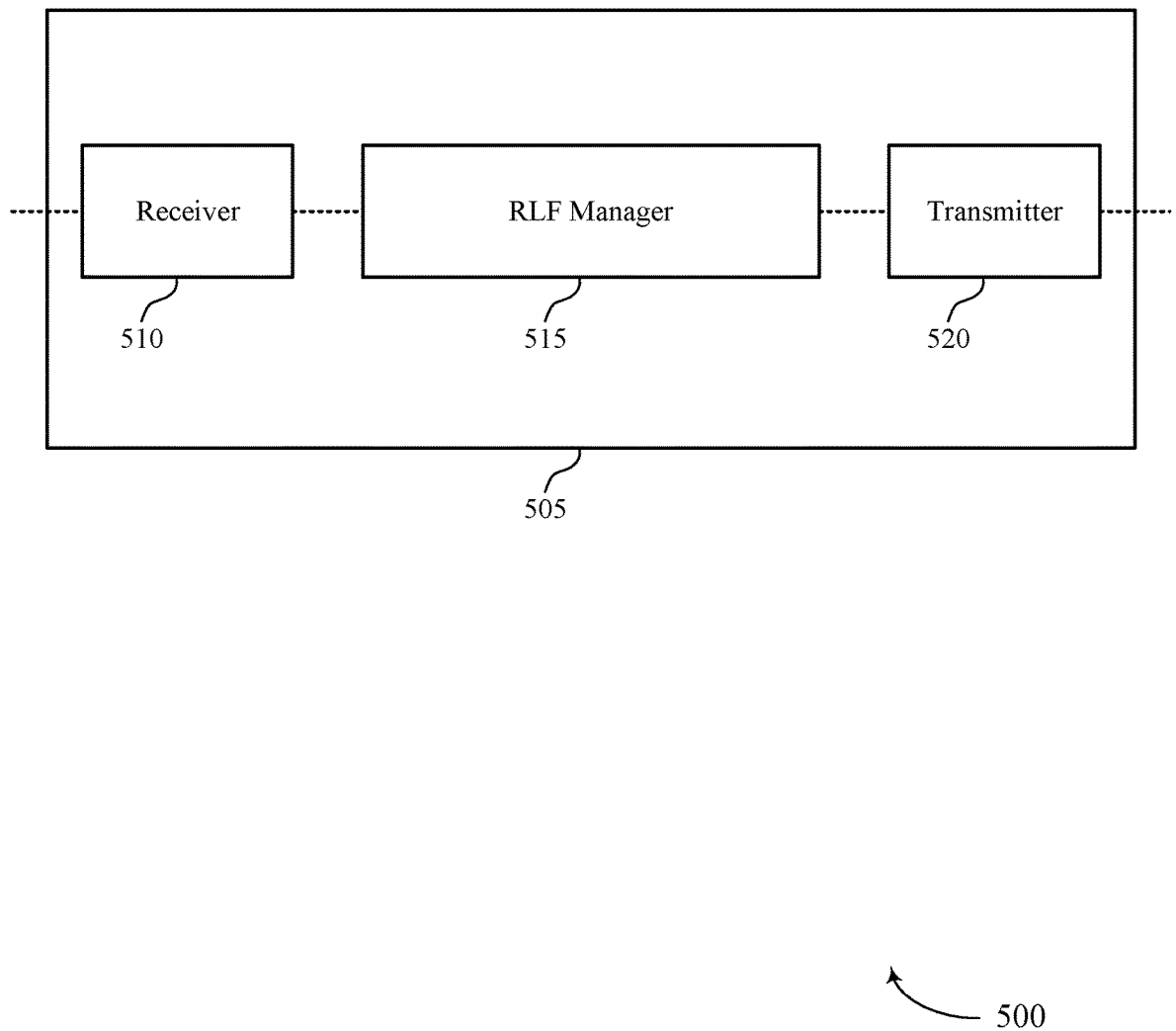
FIGS. 5 and 6 show block diagrams of devices that support RLF with generic cell group management in accordance with aspects of the present disclosure.

FIG. 5 shows a block diagram 500 of a device 505 that supports RLF with generic cell group management in accordance with aspects of the present disclosure. The device 505 may be an example of aspects of a UE 115 as described herein. The device 505 may include a receiver 510, an RLF manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to RLF with generic cell group management, etc.). Information may be passed on to other components of the device 505. The receiver 510 may be an example of aspects of the transceiver 820 described with reference to FIG. 8. The receiver 510 may utilize a single antenna or a set of antennas.

The RLF manager 515 may detect a radio link failure condition for a connection between the UE and a network over a first cell group, determine, in response to detecting the radio link failure condition, whether an air interface resource allocation is available for a signaling radio bearer (SRB) between the UE and the network over another cell group, and select, based on the determination, one of a set of radio link failure procedures. The RLF manager 515 may be an example of aspects of the RLF manager 810 described herein.

The RLF manager 515, or its sub-components, may be implemented in hardware, code (e.g., software or firmware) executed by a processor, or any combination thereof. If implemented in code executed by a processor, the functions of the RLF manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The RLF manager 515, or its sub-components, may be physically located at various positions, including being distributed such that portions of functions are implemented at different physical locations by one or more physical components. In some examples, the RLF manager 515, or its sub-components, may be a separate and distinct component in accordance with various aspects of the present disclosure. In some examples, the RLF manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
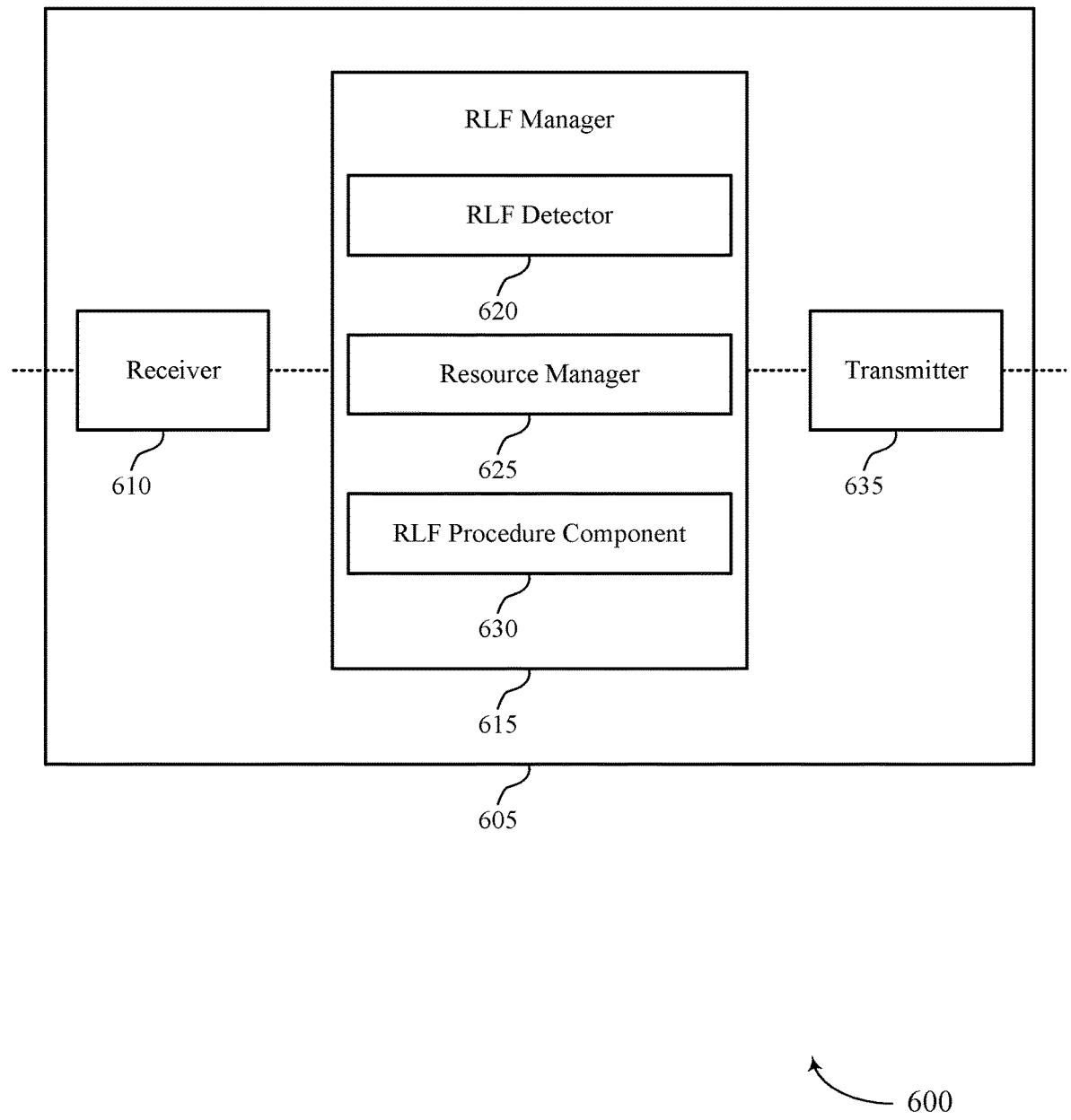

FIG. 6 shows a block diagram 600 of a device 605 that supports RLF with generic cell group management in accordance with aspects of the present disclosure. The device 605 may be an example of aspects of a device 505 or a UE 115 as described herein. The device 605 may include a receiver 610, an RLF manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to RLF with generic cell group management, etc.). Information may be passed on to other components of the device 605. The receiver 610 may be an example of aspects of the transceiver 820 described with reference to FIG. 8. The receiver 610 may utilize a single antenna or a set of antennas.

The RLF manager 615 may be an example of aspects of the RLF manager 515 as described herein. The RLF manager 615 may include an RLF detector 620, a resource manager 625, and an RLF procedure component 630. The RLF manager 615 may be an example of aspects of the RLF manager 810 described herein.

The RLF detector 620 may detect a radio link failure condition for a connection between the UE and a network over a first cell group. The RLF detector 620 may detect an RLF condition based on receiving an indication of or detecting a T310 expiry, determining an RLC RETX_COUNT exceeding a transmission limit, or detecting random access problems. In other examples, other indications of an RLF condition may be used.

The resource manager 625 may determine, in response to detecting the radio link failure condition, whether an air interface resource allocation is available for an SRB between the UE and the network over another cell group. The resource manager 625 may determine that there is an air interface resource allocation available if there is an additional available CCG. In some examples, the resource manager 625 may determine this based on the network configuration.

The RLF procedure component 630 may select, based on the determination, one of a set of radio link failure procedures. The RLF procedure component 630 may select a first RLF procedure if there is no additional CCG available or a second RLF procedure if there is an additional CCG available.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
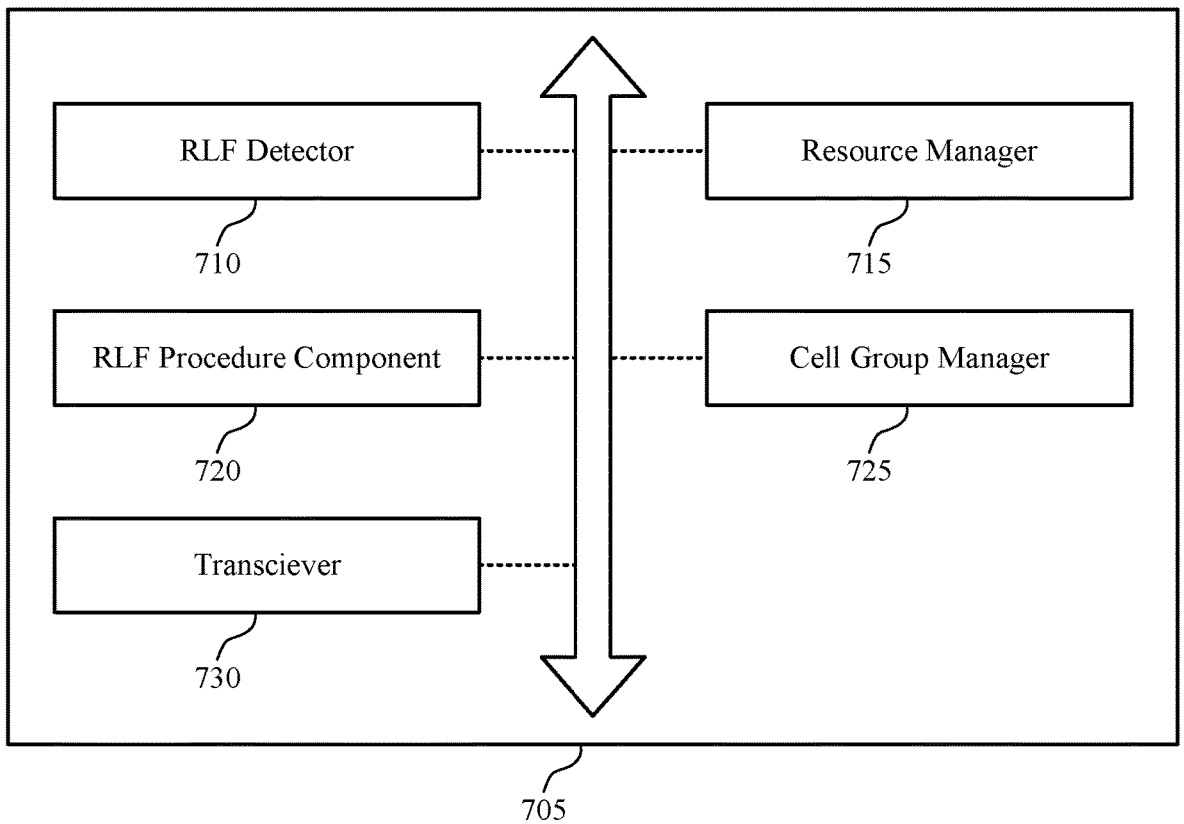
FIG. 7 shows a block diagram of an RLF manager that supports RLF with generic cell group management in accordance with aspects of the present disclosure.

FIG. 7 shows a block diagram 700 of an RLF manager 705 that supports RLF with generic cell group management in accordance with aspects of the present disclosure. The RLF manager 705 may be an example of aspects of an RLF manager 515, an RLF manager 615, or an RLF manager 810 described herein. The RLF manager 705 may include a RLF detector 710, a resource manager 715, a RLF procedure component 720, a cell group manager 725, and a transceiver 730. Each of these modules may communicate, directly or indirectly, with one another (e.g., via one or more buses).

The RLF detector 710 may detect a radio link failure condition for a connection between the UE and a network over a first cell group.

The resource manager 715 may determine, in response to detecting the radio link failure condition, whether an air interface resource allocation is available for an SRB between the UE and the network over another cell group. In some examples, the resource manager 715 may suspend all radio bearers of the UE. These radio bearers may be associated with the failed CCG. The resource manager 715 may reset MAC settings of the UE.

In some examples, the resource manager 715 may determine that the air interface resource allocation is not available when an SRB is not configured for an RLC or a MAC on the another cell group or determine that the air interface resource allocation is not available when a resource allocation for the SRB is not activated on the another cell group. In some examples, the resource manager 715 may release all SCells associated with the first cell group, suspend all DRBs associated with the first cell group, suspend transmissions on resources of the first cell group, reset a MAC entity corresponding to the first cell group.

The RLF procedure component 720 may select, based on the determination, one of a set of radio link failure procedures. Selecting one of the set of radio link failure procedures is further based on the type of the first cell group. The RLF procedure component 720 may select a first radio link failure procedure in response to determining that the air interface resource allocation for the SRB between the UE and the network over another cell group is not available. For example, the RLF procedure component 720 may select a first radio link failure procedure in response to determining that no SRB is available between the UE and the network over another cell group. In some examples where the first radio link failure procedure is selected, the first radio link failure procedure includes a full release of radio resources between the UE and the network.

In some examples, the RLF procedure component 720 may select a second radio link failure procedure in response to determining that the air interface resource allocation for the SRB between the UE and the network is available over a second cell group. In some examples where the second radio link failure procedure is selected, the second radio link failure procedure includes a partial release of radio resources between the UE and the network.

The cell group manager 725 may identify a type of the first cell group as one of a controlling cell group (CCG) or a non-controlling cell group (NCCG). In some examples, the cell group manager 725 may release all other cell groups associated with the connection based on the RLF condition.

The transceiver 730 may transmit an indication of the radio link failure condition to the another cell group using the SRB. In some examples, the SRB may be a split SRB while in other examples the SRB may be a direct SRB. In some examples, this may also apply to split or direct data radio bearers. In some examples, the SRB may be an SRB configured on another cell group, such as a second cell group. In some examples, the SRB configured on the another cell group can be an independent SRB such that it is not associated with, configured by or for, or used for a different cell group.

Figure 8:
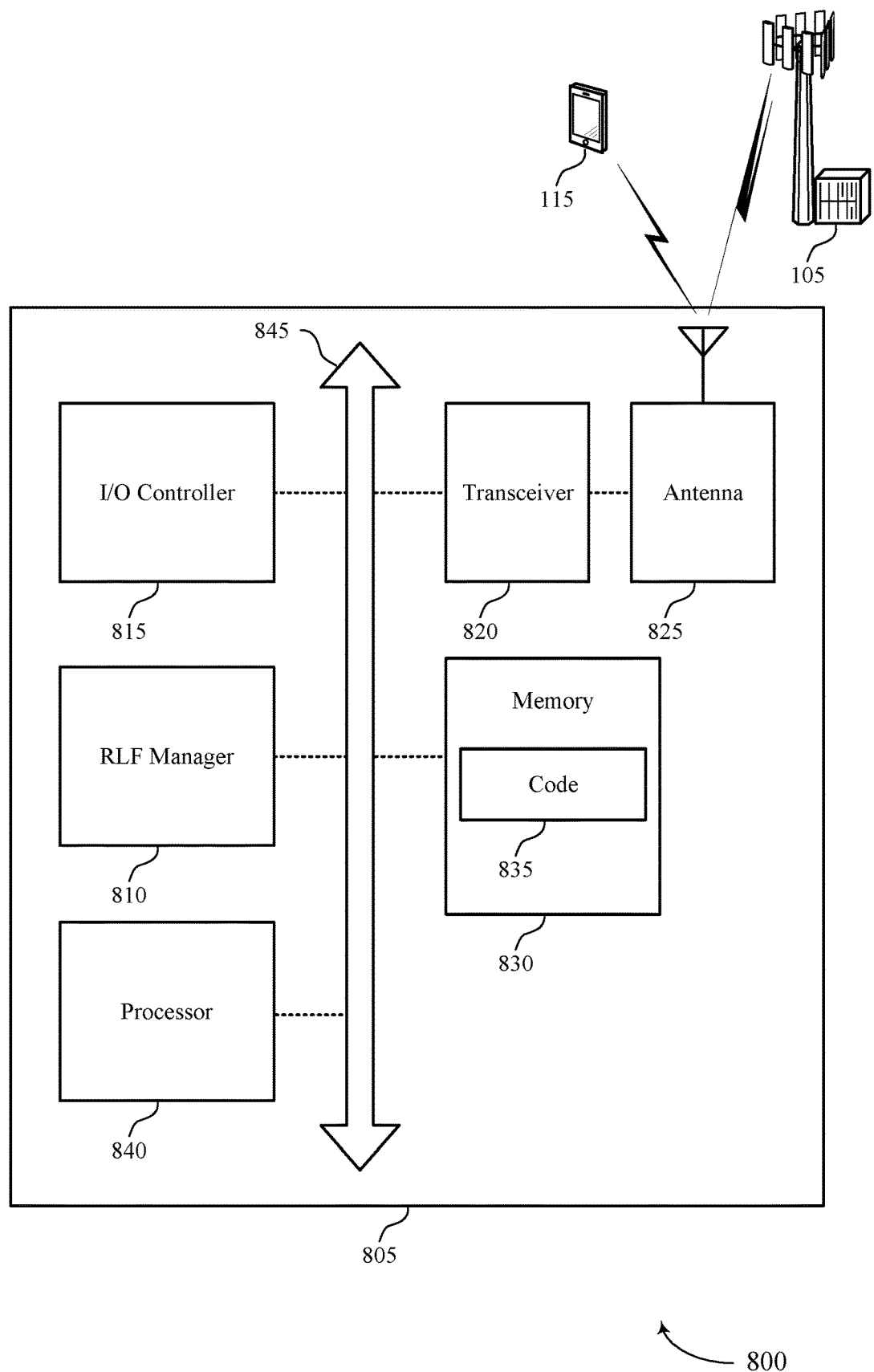
FIG. 8 shows a diagram of a system including a device that supports RLF with generic cell group management in accordance with aspects of the present disclosure.

FIG. 8 shows a diagram of a system 800 including a device 805 that supports RLF with generic cell group management in accordance with aspects of the present disclosure. The device 805 may be an example of or include the components of device 505, device 605, or a UE 115 as described herein. The device 805 may include components for bi-directional voice and data communications including components for transmitting and receiving communications, including an RLF manager 810, an I/O controller 815, a transceiver 820, an antenna 825, memory 830, and a processor 840. These components may be in electronic communication via one or more buses (e.g., bus 845).

The RLF manager 810 may detect a radio link failure condition for a connection between the UE and a network over a first cell group, determine, in response to detecting the radio link failure condition, whether an air interface resource allocation is available for an SRB between the UE and the network over another cell group, and select, based on the determination, one of a set of radio link failure procedures.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting RLF with generic cell group management).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
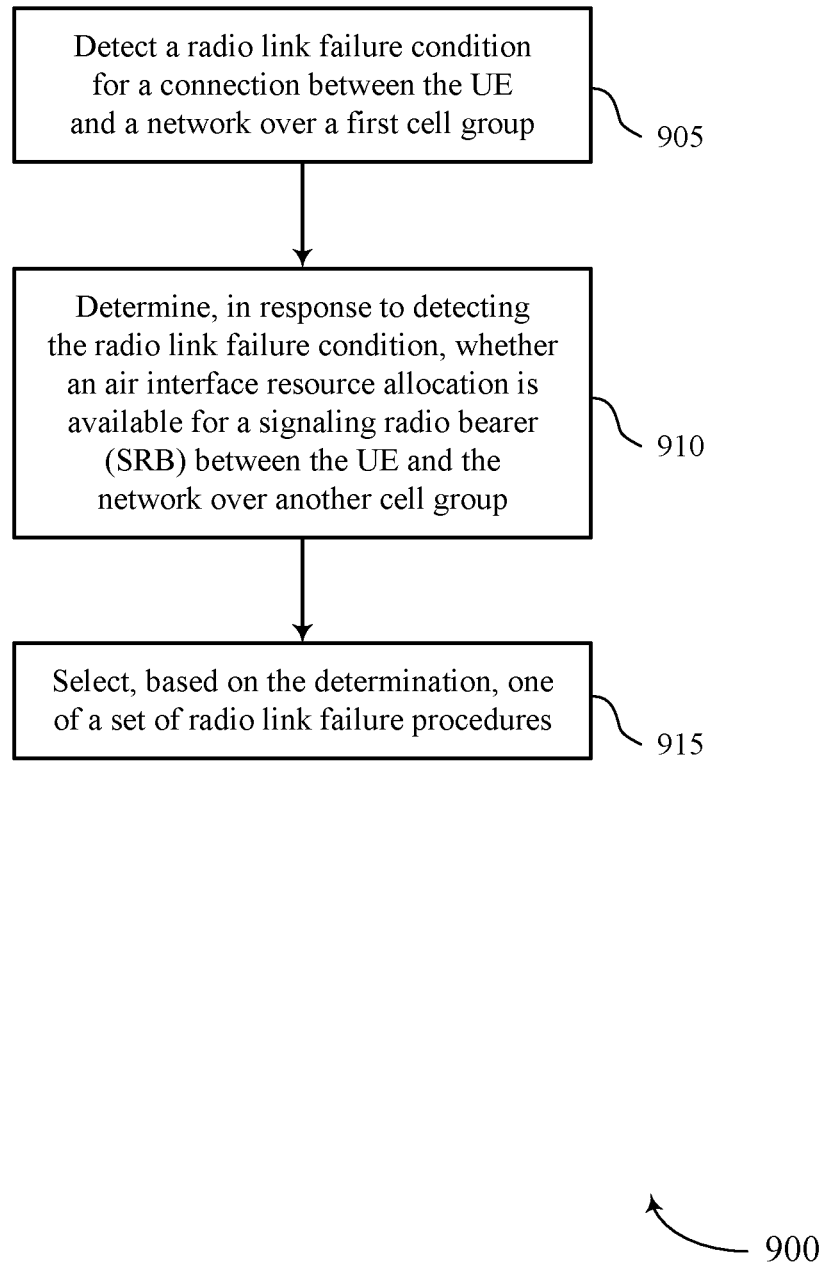
FIGS. 9 through 12 show flowcharts illustrating methods that support RLF with generic cell group management in accordance with aspects of the present disclosure.

FIG. 9 shows a flowchart illustrating a method 900 that supports RLF with generic cell group management in accordance with aspects of the present disclosure. The operations of method 900 may be implemented by a UE 115 or its components as described herein. For example, the operations of method 900 may be performed by an RLF manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At block 905, the UE may detect a radio link failure condition for a connection between the UE and a network over a first cell group. The operations of block 905 may be performed according to the methods described herein. In some examples, aspects of the operations of block 905 may be performed by an RLF detector as described with reference to FIGS. 5 through 8.

At block 910, the UE may determine, in response to detecting the radio link failure condition, whether an air interface resource allocation is available for an SRB between the UE and the network over another cell group. The operations of block 910 may be performed according to the methods described herein. In some examples, aspects of the operations of block 910 may be performed by a resource manager as described with reference to FIGS. 5 through 8.

At block 915, the UE may select, based on the determination, one of a set of radio link failure procedures. The operations of block 915 may be performed according to the methods described herein. In some examples, aspects of the operations of block 915 may be performed by an RLF procedure component as described with reference to FIGS. 5 through 8.

Figure 10:
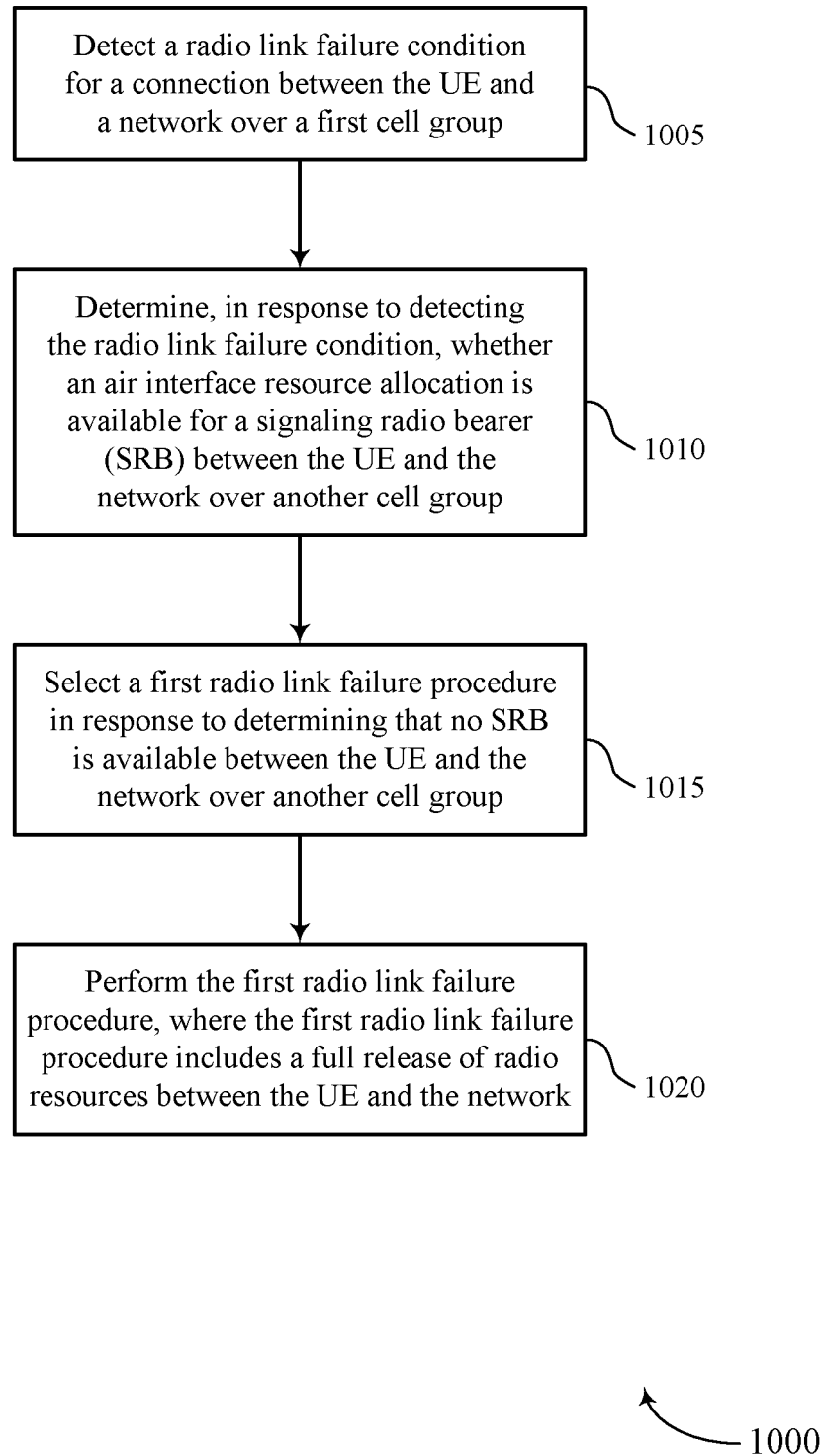

FIG. 10 shows a flowchart illustrating a method 1000 that supports RLF with generic cell group management in accordance with aspects of the present disclosure. The operations of method 1000 may be implemented by a UE 115 or its components as described herein. For example, the operations of method 1000 may be performed by an RLF manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At block 1005, the UE may detect a radio link failure condition for a connection between the UE and a network over a first cell group. The operations of block 1005 may be performed according to the methods described herein. In some examples, aspects of the operations of block 1005 may be performed by an RLF detector as described with reference to FIGS. 5 through 8.

At block 1010, the UE may determine, in response to detecting the radio link failure condition, whether an air interface resource allocation is available for an SRB between the UE and the network over another cell group. The operations of block 1010 may be performed according to the methods described herein. In some examples, aspects of the operations of block 1010 may be performed by a resource manager as described with reference to FIGS. 5 through 8.

At block 1015, the UE may select a first radio link failure procedure in response to determining that the air interface resource allocation for the SRB between the UE and the network over another cell group is not available. The selection of the first radio link failure procedure may be based on the determination that there is no air interface resource allocation available for the SRB. The operations of block 1015 may be performed according to the methods described herein. In some examples, aspects of the operations of block 1015 may be performed by an RLF procedure component as described with reference to FIGS. 5 through 8.

At block 1020, the UE may perform the first radio link failure procedure, where the first radio link failure procedure includes a full release of radio resources between the UE and the network. The operations of block 1020 may be performed according to the methods described herein. In some examples, aspects of the operations of block 1020 may be performed by an RLF procedure component as described with reference to FIGS. 5 through 8.

Figure 11:
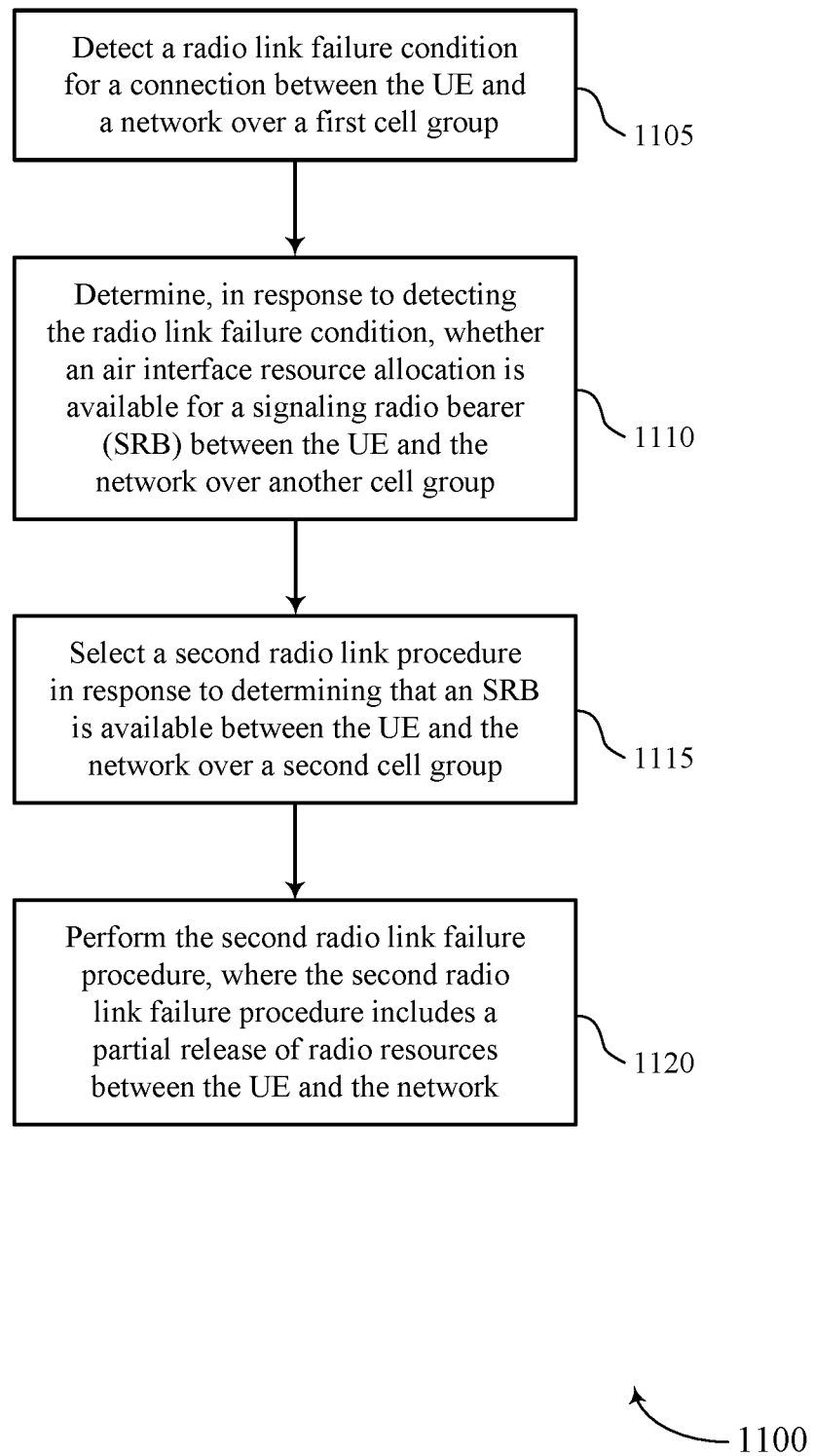

FIG. 11 shows a flowchart illustrating a method 1100 that supports RLF with generic cell group management in accordance with aspects of the present disclosure. The operations of method 1100 may be implemented by a UE 115 or its components as described herein. For example, the operations of method 1100 may be performed by an RLF manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At block 1105, the UE may detect a radio link failure condition for a connection between the UE and a network over a first cell group. The operations of block 1105 may be performed according to the methods described herein. In some examples, aspects of the operations of block 1105 may be performed by an RLF detector as described with reference to FIGS. 5 through 8.

At block 1110, the UE may determine, in response to detecting the radio link failure condition, whether an air interface resource allocation is available for an SRB between the UE and the network over another cell group. The operations of block 1110 may be performed according to the methods described herein. In some examples, aspects of the operations of block 1110 may be performed by a resource manager as described with reference to FIGS. 5 through 8.

At block 1120, the UE may select a second radio link failure procedure in response to determining that the air interface resource allocation for the SRB between the UE and the network is available over a second cell group. The UE may select the second radio link failure procedure based on the determination that an air interface resource allocation is available for an SRB between the UE and the network over another cell group. The operations of block 1120 may be performed according to the methods described herein. In some examples, aspects of the operations of block 1120 may be performed by an RLF procedure component as described with reference to FIGS. 5 through 8.

At block 1125, the UE may perform the second radio link failure procedure, where the second radio link failure procedure includes a partial release of radio resources between the UE and the network. The operations of block 1125 may be performed according to the methods described herein. In some examples, aspects of the operations of block 1125 may be performed by an RLF procedure component as described with reference to FIGS. 5 through 8.

Figure 12:
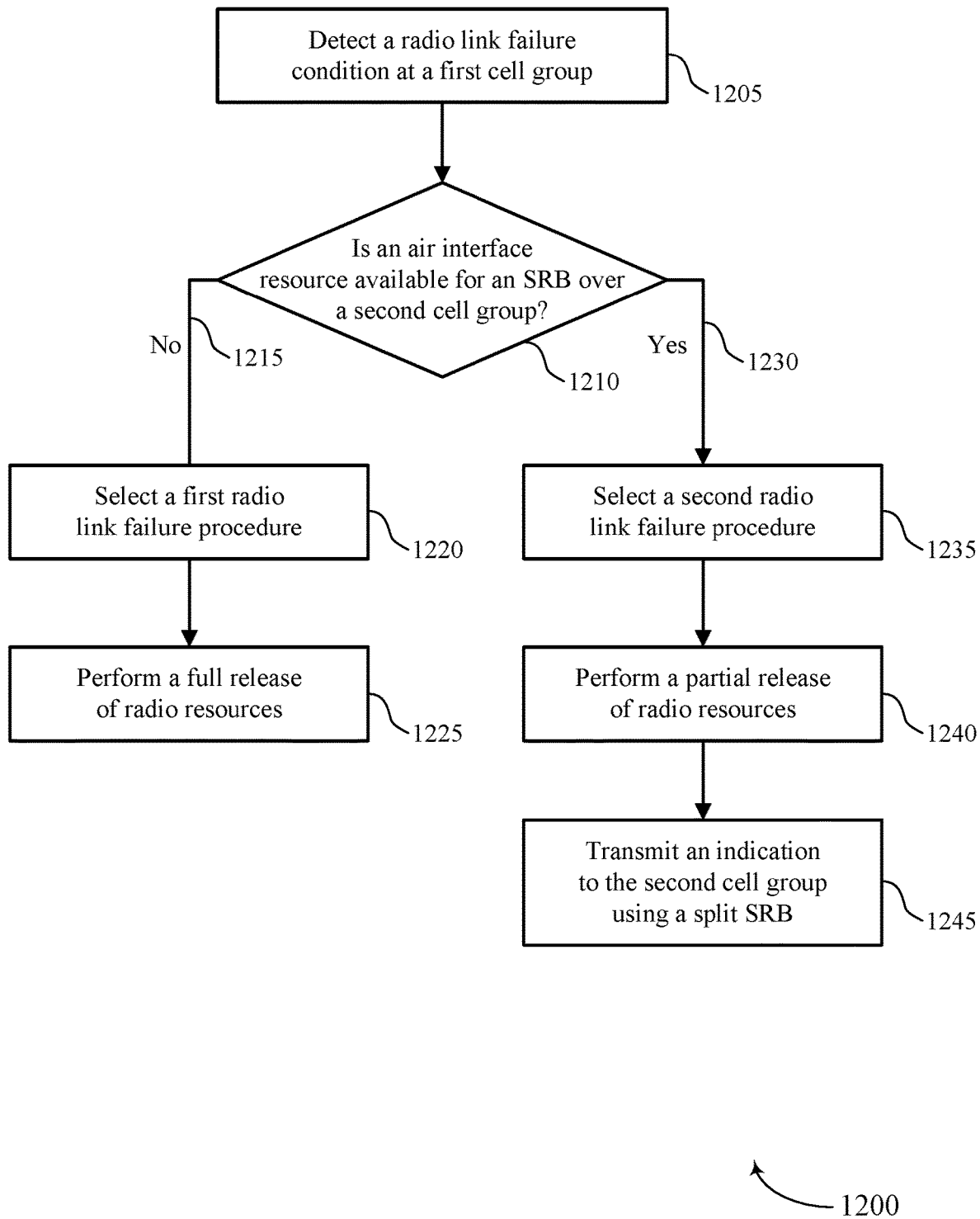

FIG. 12 shows a flowchart illustrating a method 1200 that supports RLF with generic cell group management in accordance with aspects of the present disclosure. The operations of method 1200 may be implemented by a UE 115 or its components as described herein. For example, the operations of method 1200 may be performed by an RLF manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At block 1205, the UE may detect a radio link failure condition for a connection between the UE and a network over a first cell group. The operations of block 1205 may be performed according to the methods described herein. In some examples, aspects of the operations of block 1205 may be performed by an RLF detector as described with reference to FIGS. 5 through 8.

At block 1210, the UE may determine, in response to detecting the radio link failure condition, whether an air interface resource allocation is available for an SRB between the UE and the network over another cell group. The operations of block 1210 may be performed according to the methods described herein. In some examples, aspects of the operations of block 1210 may be performed by a resource manager as described with reference to FIGS. 5 through 8.

If the UE determines that there is not an air interface resource allocation available for an SRB, method 1200 follows path 1215. At block 1220, the UE may select a first RLF procedure. At block 1225, the UE performs the selected first RLF procedure, which entails performing a full release of radio resources. The operations of block 1220 and block 1225 may be performed according to the methods described herein. In some examples, aspects of the operations of block 1235 may be performed by an RLF procedure component as described with reference to FIGS. 5 through 8.

If the UE determines that there is an air interface resource allocation available for an SRB, method 1200 follows path 1230. At block 1235, the UE may select a second radio link failure procedure in response to determining that the air interface resource allocation for the SRB between the UE and the network is available over a second cell group. For example, the UE may select a second radio link failure procedure in response to determining that an SRB is available between the UE and the network over a second cell group. The operations of block 1235 may be performed according to the methods described herein. In some examples, aspects of the operations of block 1235 may be performed by an RLF procedure component as described with reference to FIGS. 5 through 8.

At block 1240, the UE may perform the second radio link failure procedure, where the second radio link failure procedure includes a partial release of radio resources between the UE and the network. The operations of block 1240 may be performed according to the methods described herein. In some examples, aspects of the operations of block 1240 may be performed by an RLF procedure component as described with reference to FIGS. 5 through 8.

At block 1245, the UE may provide an indication to the second CCG using the split SRB. In some examples, the UE may also, or alternatively, provide an indication to the network of the performance of the second RLF procedure. The operations of block 1245 may be performed according to the methods described herein. In some examples, aspects of the operations of block 1245 may be performed by an RLF procedure component as described with reference to FIGS. 5 through 8.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as CDMA, TDMA, FDMA, OFDMA, single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like).

An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   detecting a radio link failure condition for a connection between the UE and a network over a first cell group;

determining, in response to detecting the radio link failure condition, whether an air interface resource allocation is available for a signaling radio bearer (SRB) between the UE and the network over another cell group; and selecting, based at least in part on the determination, one of a plurality of radio link failure procedures.

2. The method of claim 1, further comprising:

identifying a type of the first cell group as one of: a controlling cell group (CCG) or a non-controlling cell group (NCCG); and wherein selecting one of the plurality of radio link failure procedures is further based on the type of the first cell group.

3. The method of claim 1, wherein selecting one of the plurality of radio link failure procedures further comprises:

selecting a first radio link failure procedure in response to determining that the air interface resource allocation for the SRB between the UE and the network over the another cell group is not available; and performing the first radio link failure procedure, wherein the first radio link failure procedure comprises a full release of radio resources between the UE and the network.

4. The method of claim 3, wherein performing the first radio link failure procedure further comprises:

suspending all radio bearers of the UE; and resetting media access control (MAC) settings of the UE.

5. The method of claim 3, wherein performing the first radio link failure procedure further comprises one or more of:

releasing all secondary cells (SCells) associated with the first cell group; or; and releasing all other cell groups associated with the connection.

6. The method of claim 1, wherein selecting one of the plurality of radio link failure procedures comprises:

selecting a second radio link failure procedure in response to determining that the air interface resource allocation for the SRB between the UE and the network is available over a second cell group; and performing the second radio link failure procedure, wherein the second radio link failure procedure comprises a partial release of radio resources between the UE and the network.

7. The method of claim 6, wherein performing the second radio link failure procedure further comprises:

transmitting an indication of the radio link failure condition to the another cell group using the SRB.

8. The method of claim 6, wherein the SRB comprises one of a split SRB associated with the first cell group and the second cell group or an SRB configured on the second cell group.

9. The method of claim 6, wherein performing the second radio link failure procedure further comprises one or more of:

suspending all data radio bearers (DRBs) associated with the first cell group;

suspending transmissions on resources of the first cell group; and resetting a media access control (MAC) entity corresponding to the first cell group.

10. The method of claim 1, wherein the connection is associated with signaling radio bearers comprising one or more of a direct SRB, a split SRB, a direct data radio bearer (DRB), and a split DRB.

11. The method of claim 1, wherein determining whether the air interface resource allocation is available further comprises:

determining that the air interface resource allocation is not available when an SRB is not configured for a radio link control (RLC) or a media access control (MAC) on the another cell group; or determining that the air interface resource allocation is not available when a resource allocation for the SRB is not activated on the another cell group.

12. An apparatus for wireless communications at a user equipment (UE), comprising: a processor, memory coupled with the processor; and instructions stored in the memory and executable by the processor to cause the apparatus to:

detect a radio link failure condition for a connection between the UE and a network over a first cell group;

determine, in response to detecting the radio link failure condition, whether an air interface resource allocation is available for a signaling radio bearer (SRB) between the UE and the network over another cell group; and select, based at least in part on the determination, one of a plurality of radio link failure procedures.

13. The apparatus of claim 12, wherein the instructions are further executable by the processor to cause the apparatus to:

identify a type of the first cell group as one of: a controlling cell group (CCG) or a non-controlling cell group (NCCG); and wherein selecting one of the plurality of radio link failure procedures is further based on the type of the first cell group.

14. The apparatus of claim 12, wherein the instructions to select one of the plurality of radio link failure procedures further are executable by the processor to cause the apparatus to:

select a first radio link failure procedure in response to determining that the air interface resource allocation for the SRB between the UE and the network over another cell group is not available; and perform the first radio link failure procedure, wherein the first radio link failure procedure comprises a full release of radio resources between the UE and the network.

15. The apparatus of claim 14, wherein the instructions to perform the first radio link failure procedure further are executable by the processor to cause the apparatus to:

suspend all radio bearers of the UE; and reset media access control (MAC) settings of the UE.

16. The apparatus of claim 14, wherein the instructions to perform the first radio link failure procedure further comprises one or more of: are executable by the processor to cause the apparatus to:

release all secondary cells (SCells) associated with the first cell group; or release all other cell groups associated with the connection.

17. The apparatus of claim 12, wherein the instructions to select one of the plurality of radio link failure procedures are executable by the processor to cause the apparatus to:

select a second radio link failure procedure in response to determining that the air interface resource allocation for the SRB between the UE and the network is available over a second cell group; and perform the second radio link failure procedure, wherein the second radio link failure procedure comprises a partial release of radio resources between the UE and the network.

18. The apparatus of claim 17, wherein the instructions to perform the second radio link failure procedure further are executable by the processor to cause the apparatus to:
transmit an indication of the radio link failure condition to the second cell group using the SRB.

19. The apparatus of claim 17, wherein the SRB comprises one of a split SRB associated with the first cell group and the second cell group or an SRB configured on the second cell group.

20. The apparatus of claim 17, wherein the instructions to perform the second radio link failure procedure further are executable by the processor to cause the apparatus to:
suspend all data radio bearers (DRBs) associated with the first cell group;
suspend transmissions on resources of the first cell group; and
reset a media access control (MAC) entity corresponding to the first cell group.

21. The apparatus of claim 12, wherein the connection is associated with signaling radio bearers comprising one or more of a direct SRB, a split SRB, a direct data radio bearer (DRB), and a split DRB.

22. The apparatus of claim 12, wherein the instructions to determine whether the air interface resource allocation is available further are executable by the processor to cause the apparatus to:
determine that the air interface resource allocation is not available when an SRB is not configured for a radio link control (RLC) or a media access control (MAC) on the another cell group; or
determine that the air interface resource allocation is not available when a resource allocation for the SRB is not activated on the another cell group.

23. An apparatus for wireless communications at a user equipment (UE), comprising: means for detecting a radio link failure condition for a connection between the UE and a network over a first cell group; means for determining, in response to detecting the radio link failure condition, whether an air interface resource allocation is available for a signaling radio bearer (SRB) between the UE and the network over another cell group; and means for selecting, based at least in part on the determination, one of a plurality of radio link failure procedures.

24. The apparatus of claim 23, further comprising:
means for identifying a type of the first cell group as one of: a controlling cell group (CCG) or a non-controlling cell group (NCCG); and
means for selecting one of the plurality of radio link failure procedures is further based on the type of the first cell group.

25. The apparatus of claim 23, wherein the means for selecting one of the plurality of radio link failure procedures further comprises:
means for selecting a first radio link failure procedure in response to determining that the air interface resource allocation for the SRB between the UE and the network over another cell group is not available; and
means for performing the first radio link failure procedure, wherein the first radio link failure procedure comprises a full release of radio resources between the UE and the network.

26. The apparatus of claim 25, wherein the means for performing the first radio link failure procedure further comprises:
means for suspending all radio bearers of the UE; and
means for resetting media access control (MAC) settings of the UE.

27. The apparatus of claim 25, wherein the means for performing the first radio link failure procedure further comprises one or more of: comprises:
means for releasing all secondary cells (SCells) associated with the first cell group; or
means for releasing all other cell groups associated with the connection.

28. The apparatus of claim 23, wherein the means for selecting one of the plurality of radio link failure procedures comprises:
means for selecting a second radio link failure procedure in response to determining that the air interface resource allocation for the SRB between the UE and the network is available over a second cell group; and
means for performing the second radio link failure procedure, wherein the second radio link failure procedure comprises a partial release of radio resources between the UE and the network.

29. The apparatus of claim 28, wherein the means for performing the second radio link failure procedure further comprises:
means for transmitting an indication of the radio link failure condition to the second cell group using the SRB.

30. The apparatus of claim 28, wherein the SRB comprises one of a split SRB associated with the first cell group and the second cell group or an SRB configured on the second cell group.

31. The apparatus of claim 28, wherein the means for performing the second radio link failure procedure further comprises:
means for suspending all data radio bearers (DRBs) associated with the first cell group;
means for suspending transmissions on resources of the first cell group; and
means for resetting a media access control (MAC) entity corresponding to the first cell group.

32. The apparatus of claim 23, wherein the connection is associated with signaling radio bearers comprising one or more of a direct SRB, a split SRB, a direct data radio bearer (DRB), and a split DRB.

33. The apparatus of claim 23, wherein the means for determining whether the air interface resource allocation is available further comprises:
means for determining that the air interface resource allocation is not available when an SRB is not configured for a radio link control (RLC) or a media access control (MAC) on the another cell group; or
means for determining that the air interface resource allocation is not available when a resource allocation for the SRB is not activated on the another cell group.

34. A non-transitory computer-readable medium storing code for wireless communications at a user equipment (UE), the code comprising instructions executable by a processor to:
detect a radio link failure condition for a connection between the UE and a network over a first cell group;
determine, in response to detecting the radio link failure condition, whether an air interface resource allocation is available for a signaling radio bearer (SRB) between the UE and the network over another cell group; and
select, based at least in part on the determination, one of a plurality of radio link failure procedures.

35. The non-transitory computer-readable medium of claim 34, wherein the instructions are further executable to:

identify a type of the first cell group as one of: a controlling cell group (CCG) or a non-controlling cell group (NCCG); and wherein selecting one of the plurality of radio link failure procedures is further based on the type of the first cell group.

36. The non-transitory computer-readable medium of claim 34, wherein the instructions to select one of the plurality of radio link failure procedures are further executable to:

select a first radio link failure procedure in response to determining that the air interface resource allocation for the SRB between the UE and the network over another cell group is not available; and perform the first radio link failure procedure, wherein the first radio link failure procedure comprises a full release of radio resources between the UE and the network.

37. The non-transitory computer-readable medium of claim 36, wherein the instructions to perform the first radio link failure procedure are further executable to:

suspend all radio bearers of the UE; and reset media access control (MAC) settings of the UE.

38. The non-transitory computer-readable medium of claim 36, wherein the instructions to perform the first radio link failure procedure are further executable to:

release all secondary cells (SCells) associated with the first cell group; or release all other cell groups associated with the connection.

39. The non-transitory computer-readable medium of claim 34, wherein the instructions to select one of the plurality of radio link failure procedures are further executable to:

select a second radio link failure procedure in response to determining that the air interface resource allocation for the SRB between the UE and the network is available over a second cell group; and perform the second radio link failure procedure, wherein the second radio link failure procedure comprises a partial release of radio resources between the UE and the network.

40. The non-transitory computer-readable medium of claim 39, wherein the instructions to perform the second radio link failure procedure are further executable to:

transmit an indication of the radio link failure condition to the second cell group using the SRB.

41. The non-transitory computer-readable medium of claim 39, wherein the SRB comprises one of a split SRB associated with the first cell group and the second cell group or an SRB configured on the second cell group.

42. The non-transitory computer-readable medium of claim 39, wherein the instructions to perform the second radio link failure procedure are further executable to:

suspend all data radio bearers (DRBs) associated with the first cell group;

suspend transmissions on resources of the first cell group; and reset a media access control (MAC) entity corresponding to the first cell group.

43. The non-transitory computer-readable medium of claim 34, wherein the connection is associated with signaling radio bearers comprising one or more of a direct SRB, a split SRB, a direct data radio bearer (DRB), and a split DRB.

44. The non-transitory computer-readable medium of claim 34, wherein the instructions to determine whether the air interface resource allocation is available are further executable to:

determine that the air interface resource allocation is not available when an SRB is not configured for a radio link control (RLC) or a media access control (MAC) on the another cell group; or determine that the air interface resource allocation is not available when a resource allocation for the SRB is not activated on the another cell group.

* * * * *